United States Patent
Matsuda (10) Patent No.: US 11,567,849 B2
(45) Date of Patent: Jan. 31, 2023

(54) PROCESSING DEVICE, COMMUNICATION SYSTEM, AND NON-TRANSITORY STORAGE MEDIUM

(71) Applicant: TOYOTA JIDOSHA KABUSHIKI KAISHA, Toyota (JP)

(72) Inventor: Shingo Matsuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 17/466,529

(22) Filed: Sep. 3, 2021

(65) Prior Publication Data

US 2022/0075702 A1 Mar. 10, 2022

(30) Foreign Application Priority Data

Sep. 9, 2020 (JP) .............................. JP2020-151448

(51) Int. Cl.
| | |
|---|---|
| *G06F 11/00* | (2006.01) |
| *G06F 11/30* | (2006.01) |
| *G06F 11/14* | (2006.01) |
| *G06F 11/34* | (2006.01) |

(52) U.S. Cl.
CPC ........ *G06F 11/3027* (2013.01); *G06F 11/141* (2013.01); *G06F 11/349* (2013.01)

(58) Field of Classification Search
CPC .. G06F 11/3027; G06F 11/141; G06F 11/349; G06F 11/3013
See application file for complete search history.

(56) References Cited

U.S. PATENT DOCUMENTS

| | | | | |
|---|---|---|---|---|
| 6,067,586 | A * | 5/2000 | Ziegler ................. | G06F 11/277 714/716 |
| 2002/0062460 | A1 * | 5/2002 | Okuda ..................... | H04L 1/24 714/25 |
| 2008/0059016 | A1 * | 3/2008 | Mayhew ............ | G05B 23/0289 701/34.3 |
| 2012/0203413 | A1 | 8/2012 | Eisele et al. | |
| 2018/0068501 | A1 * | 3/2018 | Kawakami .......... | G06F 11/1641 |
| 2019/0079842 | A1 * | 3/2019 | Chae ................... | G06F 11/3006 |
| 2021/0124635 | A1 * | 4/2021 | Yamazaki ........... | G06F 11/1641 |
| 2022/0075702 | A1 * | 3/2022 | Matsuda ............... | G06F 11/141 |

FOREIGN PATENT DOCUMENTS

| | | |
|---|---|---|
| JP | 2009-302783 A | 12/2009 |
| JP | 2010-206697 A | 9/2010 |
| JP | 2016-092547 A | 5/2016 |
| JP | 2016-190574 A | 11/2016 |

\* cited by examiner

*Primary Examiner* — Philip Guyton
(74) *Attorney, Agent, or Firm* — Sughrue Mion, PLLC (57) ABSTRACT

A processing device includes: a first processor configured to execute a determination process; and a second processor configured to communicate with the first processor via an internal bus, wherein the determination process includes processes of determining that the abnormality occurs inside the processing device when first reference data transmitted to the second processor and first diagnostic data that is response data to the first reference data do not correspond to each other, and determining that the abnormality occurs in at least one of an external bus or an external device when the first reference data and the first diagnostic data correspond to each other and second reference data transmitted to the external device and second diagnostic data that is response data to the second reference data do not correspond to each other.

13 Claims, 4 Drawing Sheets

PROCESSING DEVICE, COMMUNICATION SYSTEM, AND NON-TRANSITORY STORAGE MEDIUM

CROSS-REFERENCE TO RELATED APPLICATION

This application claims priority to Japanese Patent Application No. 2020-151448 filed on Sep. 9, 2020, incorporated herein by reference in its entirety.

BACKGROUND

1. Technical Field

The disclosure relates to a processing device, a communication system, and a non-transitory storage medium.

2. Description of Related Art

In a diagnostic device disclosed in Japanese Unexamined Patent Application Publication No. 2016-190574 (JP 2016-190574 A), a diagnostic target unit and a reference unit are connected to each other by a controller area network (CAN) bus. The reference unit generates diagnostic data based on reference data stored in the reference unit in response to a request from the diagnostic target unit. The reference unit then transmits the diagnostic data to the diagnostic target unit. When the diagnostic target unit receives the diagnostic data, the diagnostic target unit compares the received diagnostic data with the reference data stored in the diagnostic target unit. The diagnostic target unit detects an abnormality when the diagnostic data and the reference data do not match each other.

SUMMARY

With the technique described in JP 2016-190574 A, a case in which the reference unit has an abnormality and thus cannot calculate the diagnostic data appropriately as well as a case in which the diagnostic target unit has an abnormality and thus cannot read the reference data appropriately is conceivable as the cause of the abnormality detected. Therefore, even when the diagnostic target unit detects an abnormality, which unit has an abnormality cannot be determined.

A processing device according to a first aspect of the present disclosure includes: a first processor configured to execute a first transmission process, a first reception process, a first comparison process, a second transmission process, a second reception process, a second comparison process, and a determination process; and a second processor configured to communicate with the first processor via an internal bus, and execute a first response process. The first transmission process is a process of transmitting first reference data to the second processor via the internal bus, the first response process is a process of transmitting first diagnostic data that is response data to the first reference data when the first reference data is received, the first reception process is a process of receiving the first diagnostic data from the second processor via the internal bus, the first comparison process is a process of determining whether the first reference data that is transmitted and the first diagnostic data that is received correspond to each other, the second transmission process is a process of transmitting second reference data to an external device provided outside the processing device via an external bus, the second reception process is a process of receiving second diagnostic data that is response data to the second reference data from the external device via the external bus, the second comparison process is a process of determining whether the second reference data that is transmitted and the second diagnostic data that is received correspond to each other, the determination process is a process of determining an abnormality based on a determination result in the first comparison process and a determination result in the second comparison process, and the determination process includes a process of determining that the abnormality occurs inside the processing device when the first reference data and the first diagnostic data do not correspond to each other, and a process of determining that the abnormality occurs in at least one of the external bus or the external device when the first reference data and the first diagnostic data correspond to each other, and the second reference data and the second diagnostic data do not correspond to each other.

A communication system according to a second aspect of the present disclosure includes: a processing device including a first processor and a second processor configured to be communicable with the first processor via an internal bus, the first processor being configured to execute a first transmission process, a first reception process, a first comparison process, a second transmission process, a second reception process, a second comparison process, and a determination process, and the second processor being configured to execute a first response process; and an external device provided outside the processing device and configured to communicate with the processing device via an external bus, the external device configured to execute a second response process. The first transmission process is a process of transmitting first reference data to the second processor via the internal bus, the first response process is a process of transmitting first diagnostic data that is response data to the first reference data when the first reference data is received, the first reception process is a process of receiving the first diagnostic data from the second processor via the internal bus, the first comparison process is a process of determining whether the first reference data that is transmitted and the first diagnostic data that is received correspond to each other, the second transmission process is a process of transmitting second reference data to the external device via the external bus, the second response process is a process of transmitting second diagnostic data that is response data to the second reference data when the second reference data is received, the second reception process is a process of receiving the second diagnostic data from the external device via the external bus, the second comparison process is a process of determining whether the second reference data that is transmitted and the second diagnostic data that is received correspond to each other, the determination process is a process of determining an abnormality based on a determination result in the first comparison process and a determination result in the second comparison process, and the determination process includes a process of determining that the abnormality occurs inside the processing device when the first reference data and the first diagnostic data do not correspond to each other, and a process of determining that the abnormality occurs in at least one of the external bus or the external device when the first reference data and the first diagnostic data correspond to each other, and the second reference data and the second diagnostic data do not correspond to each other.

A non-transitory storage medium according to a third aspect of the present disclosure stores instructions that are executable by a first processor and a second processor configured to communicate with the first processor via an internal bus and that cause the first processor to execute a first transmission process, a first reception process, a first comparison process, a second transmission process, a second reception process, a second comparison process, and a determination process, and cause the second processor to execute a first response process, the first processor and the second processor being provided in a processing device. The first transmission process is a process of transmitting first reference data to the second processor via the internal bus, the first response process is a process of transmitting first diagnostic data that is response data to the first reference data when the first reference data is received, the first reception process is a process of receiving the first diagnostic data from the second processor via the internal bus, the first comparison process is a process of determining whether the first reference data that is transmitted and the first diagnostic data that is received correspond to each other, the second transmission process is a process of transmitting second reference data to an external device provided outside the processing device via an external bus, the second reception process is a process of receiving second diagnostic data that is response data to the second reference data from the external device via the external bus, the second comparison process is a process of determining whether the second reference data that is transmitted and the second diagnostic data that is received correspond to each other, the determination process is a process of determining an abnormality based on a determination result in the first comparison process and a determination result in the second comparison process, and the determination process includes a process of determining that the abnormality occurs inside the processing device when the first reference data and the first diagnostic data do not correspond to each other, and a process of determining that the abnormality occurs in at least one of the external bus or the external device when the first reference data and the first diagnostic data correspond to each other, and the second reference data and the second diagnostic data do not correspond to each other.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a communication system applied to a hybrid vehicle will be described with reference to the drawings. First, a schematic configuration of the communication system will be described.

Figure 1:
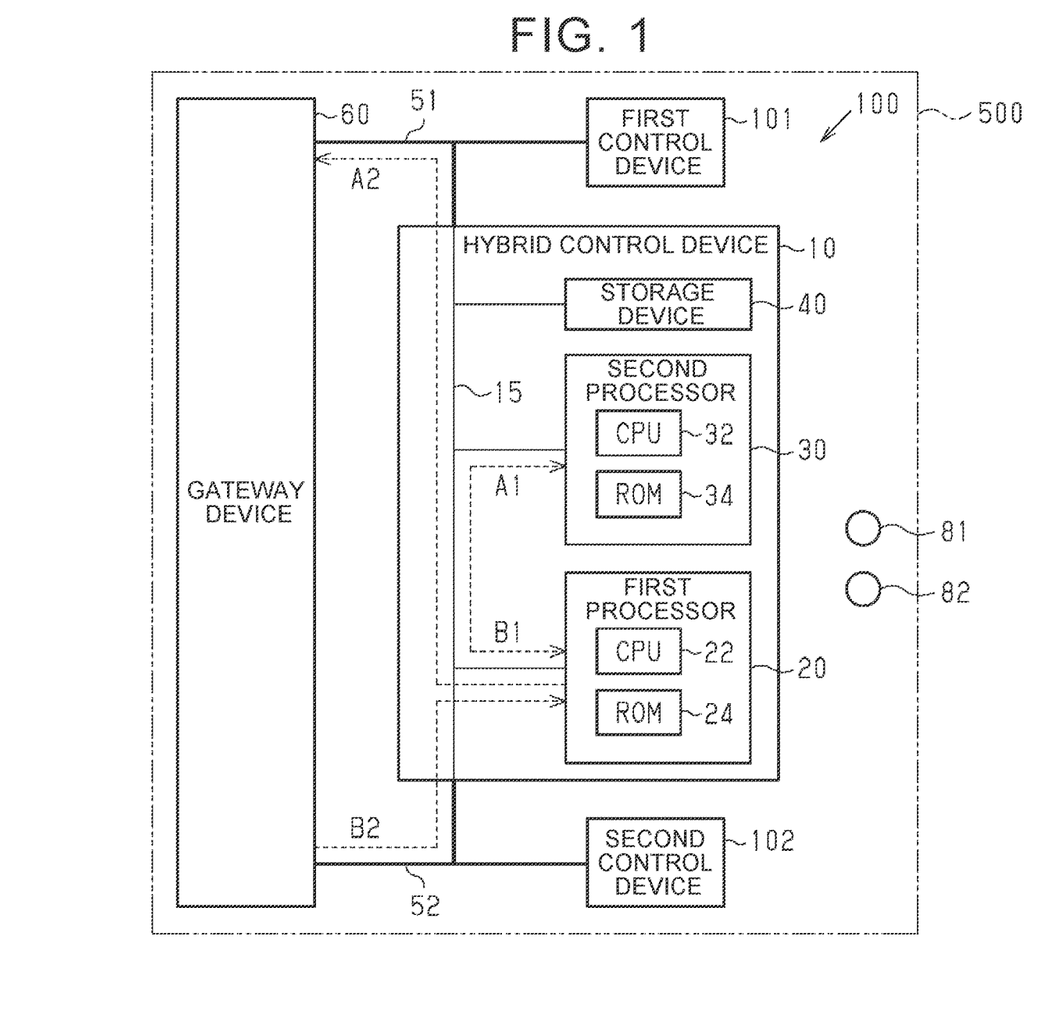
FIG. 1 is a schematic view of a communication system.

As shown in FIG. 1, a hybrid vehicle (hereinafter referred to as a vehicle) 500 is equipped with a hybrid control device 10 that comprehensively controls various components of the vehicle 500. The hybrid control device 10 constitutes a processing device.

The hybrid control device 10 includes a first processor 20 that executes various processes in accordance with a computer program (software). The first processor 20 includes a central processing unit (CPU) 22 and a memory such as a random access memory (RAM) or a read-only memory (ROM) 24. The memory stores a program code or a command configured to cause the CPU 22 to execute the processes. The memory, that is, a computer-readable medium, includes any available medium accessible by a general purpose or a dedicated computer.

The hybrid control device 10 includes a second processor 30 that executes various processes in accordance with a computer program (software). The second processor 30 includes a CPU 32 and a memory such as a RAM or a ROM 34. The memory stores a program code or a command configured to cause the CPU 32 to execute the processes. The memory, that is, a computer-readable medium, includes any available medium accessible by a general purpose or a dedicated computer.

The hybrid control device 10 includes a storage device 40 that is an electrically rewritable non-volatile memory. The storage device 40, the first processor 20, and the second processor 30 are communicable with each other via an internal bus 15 that is a communication line.

The internal bus 15 of the hybrid control device 10 is connected to a first external bus 51 composed of a controller area network (CAN) communication line. The first external bus 51 is connected to a gateway device 60. The first external bus 51 branches at a point between the hybrid control device 10 and the gateway device 60 and is connected to a first control device 101. The first control device 101 is, for example, an internal combustion engine control device that controls an internal combustion engine.

The internal bus 15 of the hybrid control device 10 is connected to a second external bus 52 composed of a CAN communication line. The second external bus 52 is connected to the gateway device 60. The second external bus 52 branches at a point between the hybrid control device 10 and the gateway device 60 and is connected to a second control device 102. The second control device 102 is, for example, a brake control device that controls a brake.

Although not shown, a plurality of CAN communication lines is connected to the gateway device 60 in addition to the first external bus 51 and the second external bus 52. The gateway device 60 has a relay function of outputting data that is input from each CAN communication line to an appropriate CAN communication line based on an identifier, etc. added to the data. In the present embodiment, the gateway device 60 constitutes another device (an external device).

Various control devices described above and a series of communication systems connecting the various control devices constitute the communication system 100. A vehicle cabin of the vehicle 500 is provided with a first notification lamp 81 and a second notification lamp 82 for notifying an abnormality of the communication system 100. The first notification lamp 81 is a lamp for notifying an abnormality of the hybrid control device 10. The second notification lamp 82 is a lamp for notifying an abnormality of the first external bus 51, the second external bus 52, and the gateway device 60.

Next, an outline of the process executed in the communication system will be described. In the communication system 100, various processes for controlling the vehicle 500 are executed. At the same time, in the communication system 100, a diagnostic process for diagnosing whether an abnormality occurs in the hybrid control device 10, the gateway device 60, the first external bus 51, and the second external bus 52 is executed.

The first processor 20 of the hybrid control device 10 can execute a process for the first processor that is a part of the diagnostic process. The first processor 20 executes a first transmission process of transmitting first reference data A1 to the second processor 30 via the internal bus 15 as a part of the process for the first processor. Further, the first processor 20 executes a first reception process of receiving first diagnostic data B1 that is response data to the first reference data A1 from the second processor 30 via the internal bus 15 as a part of the process for the first processor. Further, the first processor 20 executes a first comparison process of determining whether the first reference data A1 transmitted in the first transmission process and the first diagnostic data B1 received in the first reception process correspond to each other as a part of the process for the first processor.

In the first comparison process, the first processor 20 determines that the first reference data A1 and the first diagnostic data B1 do not correspond to each other when the first processor 20 cannot receive the first diagnostic data B1 within a first specified period H1 in the first reception process after the first processor 20 transmits the first reference data A1 in the first transmission process. The first processor 20 stores the first specified period H1 in advance. A length of the first specified period H1 will be described later together with the processes executed by the second processor 30.

The first processor 20 executes a second transmission process of transmitting second reference data A2 to the gateway device 60 via the first external bus 51 as a part of the process for the first processor. Further, the first processor 20 executes a second reception process of receiving second diagnostic data B2 that is response data to the second reference data A2 from the gateway device 60 via the second external bus 52 as a part of the process for the first processor. Further, the first processor 20 executes a second comparison process of comparing the second reference data A2 transmitted in the second transmission process with the second diagnostic data B2 received in the second reception process as a part of the process for the first processor.

In the second comparison process, the first processor 20 determines that the second reference data A2 and the second diagnostic data B2 do not correspond to each other when the first processor 20 cannot receive the second diagnostic data B2 within a second specified period H2 in the second reception process after the first processor 20 transmits the second reference data A2 in the second transmission process. The first processor 20 stores the second specified period H2 in advance. A length of the second specified period H2 will be described later together with the processes executed by the gateway device 60.

The first processor 20 executes a determination process of determining an abnormality based on a determination result in the first comparison process and a determination result in the second comparison process as a part of the process for the first processor. In the determination process, the first processor 20 determines that an abnormality occurs inside the hybrid control device 10 when the first reference data A1 and the first diagnostic data B1 do not correspond to each other. The first processor 20 determines that an abnormality occurs in at least one of the first external bus 51, the second external bus 52, and the gateway device 60 when the first reference data A1 and the first diagnostic data B1 correspond to each other and the second reference data A2 and the second diagnostic data B2 do not correspond to each other.

The second processor 30 of the hybrid control device 10 can execute a process for the second processor that is a part of the diagnostic process. As the process for the second processor, the second processor 30 executes the first response process of transmitting the first diagnostic data B1 that is response data to the first reference data A1 when the second processor 30 receives the first reference data A1. In the first response process, the second processor 30 is set to transmit the first diagnostic data B1 within the predetermined first specified period H1 after the second processor 30 receives the first reference data A1. Here, when the length of time required for the second processor 30 to complete execution of various required processes from the time when the second processor 30 receives the first reference data A1 to the time when the second processor 30 transmits the first diagnostic data B1 is set as a first required processing period, the first specified period H1 is determined to be the maximum value of the first required processing period that is allowable in a state where the second processor 30 is operating normally.

The gateway device 60 can execute a gateway process that is a part of the diagnostic process. As the gateway process, the gateway device 60 executes the second response process of transmitting the second diagnostic data B2 that is response data to the second reference data A2 when the gateway device 60 receives the second reference data A2. In the second response process, the gateway device 60 transmits the second diagnostic data B2 within the predetermined second specified period H2 after the gateway device 60 receives the second reference data A2. Here, when the length of time required for the gateway device 60 to complete execution of various required processes from the time when the gateway device 60 receives the second reference data A2 to the time when the gateway device 60 transmits the second diagnostic data B2 is set as a second required processing period, the second specified period H2 is determined to be the maximum value of the second required processing period that is allowable in a state where the gateway device 60 is operating normally.

As will be described in detail later, various types of data such as the first reference data A1 and the second reference data A2 include the identifier of a destination. Each control device of the communication system 100 refers to the identifier of the destination in each data and selects whether to receive the data. With the process above, each data reaches the destination through a predetermined communication path.

Next, a specific process procedure of the diagnostic process will be described. The first processor 20 of the hybrid control device 10 repeats the processing for the first processor from the time when an ignition switch of the vehicle 500 is operated and a system of the vehicle 500 is started to the time when the system of the vehicle 500 is stopped. The ignition switch may be referred to as a start switch or a system start switch, for example, depending on the type of the vehicle 500.

Figure 2:
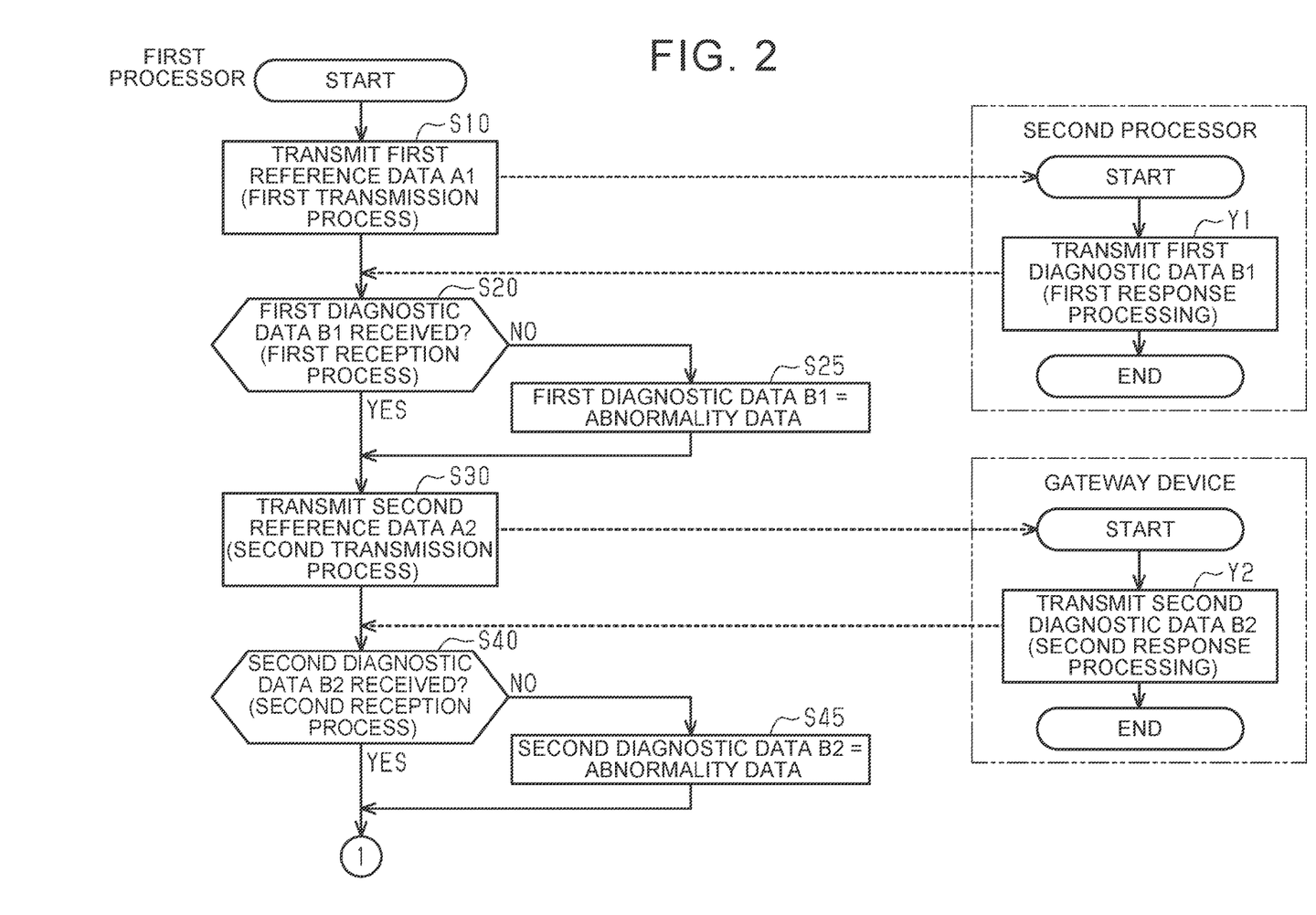
FIG. 2 is a flowchart showing a process procedure of a diagnostic process.

As shown in FIG. 2, when the first processor 20 starts the process for the first processor, the first processor 20 executes a process in step S10. In step S10, the first processor 20 transmits the first reference data A1 to the second processor 30. Specifically, the first processor 20 first generates the first reference data A1. The first reference data A1 includes header data and main data. The header data serves as an identifier indicating the destination of the first reference data A1. The destination of the first reference data A1 is the second processor 30. The main data is the time when the first reference data A1 is generated. After generating the first reference data A1, the first processor 20 transmits the first reference data A1 to the second processor 30 via the internal bus 15. The first processor 20 stores the first reference data A1 transmitted to the second processor 30 until a series of the processes for the first processor is completed. When the first processor 20 completes the process in step S10, the process proceeds to step S20. The process in step S10 is the first transmission process.

Here, when the second processor 30 receives the first reference data A1 in response to the process in step S10, the second processor 30 transmits the first diagnostic data B1 to the first processor 20 as a first response process Y1. Specifically, the second processor 30 first generates the first diagnostic data B1. The first diagnostic data B1 includes the header data and the main data as well as the first reference data A1. The second processor 30 sets the main data of the first reference data A1 as the main data of the first diagnostic data B1 without change. Further, the second processor 30 sets the first processor 20 as the identifier of the destination that serves as the header data. After generating the first diagnostic data B1, the second processor 30 transmits the first diagnostic data B1 to the first processor 20 via the internal bus 15.

In step S20 in the process for the first processor, the first processor 20 determines whether the first diagnostic data B1 is received within the first specified period H1 after the first processor 20 transmits the first reference data A1 in step S10. Here, for example, when an abnormality occurs in the internal bus 15 or the second processor 30, there may be a case where communication of the first reference data A1 and the first diagnostic data B1 is not performed normally. In the case above, the first processor 20 cannot receive the first diagnostic data B1 within the first specified period H1 after the first processor 20 transmits the first reference data A1. When the first processor 20 has not received the first diagnostic data B1 within the first specified period H1 after the first processor 20 transmits the first reference data A1 (step S20: NO), the first processor 20 advances the process to step S25. In step S25, the first processor 20 sets abnormality data as the first diagnostic data B1. The abnormality data is predetermined as data indicating a value that the first reference data A1 cannot take, such as a negative value. The first processor 20 uses the first diagnostic data B1 generated in step S25 as the first diagnostic data B1 received in step S20. Further, the first processor 20 stores the first diagnostic data B1 generated in step S25 until a series of processes for the first processor is completed. When the first processor 20 completes the process in step S25, the first processor 20 advances the process to step S30.

On the other hand, in step S20, when the first processor 20 has received the first diagnostic data B1 within the first specified period H1 after the first processor 20 transmits the first reference data A1 in step S10 (step S20: YES), the first processor 20 skips the process in step S25 and advances the process to step S30. When the first processor 20 has received the first diagnostic data B1 in step S20, the first processor 20 stores the received first diagnostic data B1 until a series of the processes for the first processor is completed. The process in step S20 is the first reception process.

In step S30, the first processor 20 transmits the second reference data A2 to the gateway device 60. Specifically, the first processor 20 first generates the second reference data A2. The second reference data A2 includes the header data and the main data as well as the first reference data A1. The header data serves as the identifier indicating the destination of the second reference data A2. The destination of the second reference data A2 is the first processor 20 itself. The main data is the time when the second reference data A2 is generated, as in the case of the first reference data A1. When the first processor 20 generates the second reference data A2, the first processor 20 transmits the second reference data A2 to the gateway device 60 via the first external bus 51. The first processor 20 stores the second reference data A2 transmitted to the gateway device 60 until a series of the processes for the first processor is completed. When the first processor 20 completes the process in step S30, the first processor 20 advances the process to step S40. The process in step S30 is the second transmission process.

Here, when the gateway device 60 receives the second reference data A2 in response to the process in step S30, the gateway device 60 transmits the second diagnostic data B2 to the first processor 20 of the hybrid control device 10 as a second response process Y2. At that time, the gateway device 60 uses the second reference data A2 as the second diagnostic data B2 without change, and transmits the second diagnostic data B2 to the first processor 20 of the hybrid control device 10 via the second external bus 52.

In step S40 in the process for the first processor, the first processor 20 determines whether the first processor 20 receives the second diagnostic data B2 within the second specified period H2 after the first processor 20 transmits the second reference data A2 in step S30. Here, for example, when an abnormality occurs in the first external bus 51 or the second external bus 52, there may be a case where communication of the second reference data A2 and the second diagnostic data B2 is not performed normally. In the case above, the first processor 20 cannot receive the second diagnostic data B2 within the second specified period H2 after completion of the process in step S30. When the first processor 20 has not received the second diagnostic data B2 within the second specified period H2 after the first processor 20 transmits the second reference data A2 (step S40: NO), the first processor 20 advances the process to step S45. In step S45, the first processor 20 sets the abnormality data as the second diagnostic data B2. The first processor 20 uses the second diagnostic data B2 generated in step S45 as the second diagnostic data B2 received in step S40. Further, the first processor 20 stores the second diagnostic data B2 generated in step S45 until a series of processes for the first processor is completed. When the first processor 20 completes the process in step S45, the first processor 20 advances the process to step S50.

On the other hand, in step S40, when the first processor 20 receives the second diagnostic data B2 within the first specified period H1 after the first processor 20 transmits the second reference data A2 in step S30 (step S40: YES), the first processor 20 skips the process in step S45 and advances the process to step S50. When the first processor 20 receives the second diagnostic data B2 in step S40, the first processor 20 stores the received second diagnostic data B2 until a series of the processes for the first processor is completed. The process in step S40 is the second reception process.

Figure 3:
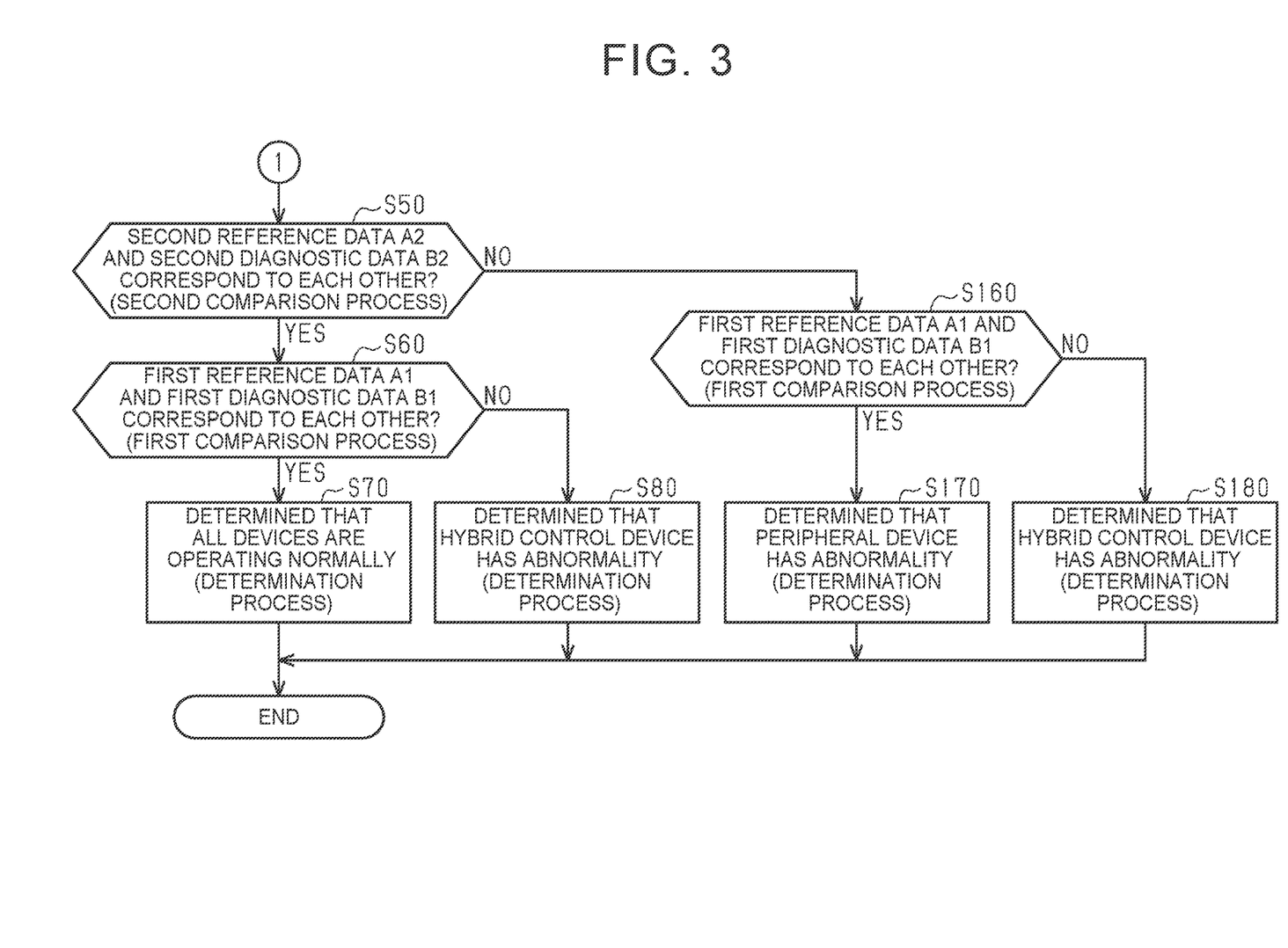
FIG. 3 is a flowchart showing a process procedure of the diagnostic process.

As shown in FIG. 3, in step S50, the first processor 20 determines whether the second reference data A2 transmitted in step S30 and the second diagnostic data B2 received in step S40 correspond to each other. When the second reference data A2 and the second diagnostic data B2 do not match each other, the first processor 20 determines that the second reference data A2 and the second diagnostic data B2 do not correspond to each other (step S50: NO). In this case, the first processor 20 advances the process to step S160. As described above, when the first processor 20 has not received the second diagnostic data B2 within the second specified period H2 after the first processor 20 transmits the second reference data A2 in the process in step S30 (step S40: NO), the abnormality data is set as the second diagnostic data B2 (step S45). In this case, the determination in step S50 is NO. That is, when the first processor 20 cannot receive the second diagnostic data B2 within the second specified period H2 after the first processor 20 transmits the second reference data A2, the first processor 20 determines that the second diagnostic data B2 and the second reference data A2 do not correspond to each other. The process in step S50 is the second comparison process.

In step S160, the first processor 20 determines whether the first reference data A1 transmitted in step S10 and the first diagnostic data B1 received in step S20 correspond to each other. When the main data of the first reference data A1 and the main data of the first diagnostic data B1 do not match each other, the first processor 20 determines that the first reference data A1 and the first diagnostic data B1 do not correspond to each other (step S160: NO). In this case, the first processor 20 advances the process to step S180. As described above, when the first processor 20 has not received the first diagnostic data B1 within the first specified period H1 after the first processor 20 transmits the first reference data A1 in the process in step S10 (step S20: NO), the abnormality data is set as the first diagnostic data B1 (step S25). In this case, the determination in step S160 is NO. That is, when the first processor 20 cannot receive the first diagnostic data B1 within the first specified period H1 after the first processor 20 transmits the first reference data A1, the first processor 20 determines that the first diagnostic data B1 and the first reference data A1 do not correspond to each other. The process in step S160 is the first comparison process.

In step S180, the first processor 20 determines that an abnormality occurs inside the hybrid control device 10. The first processor 20 then stores, in the storage device 40, information indicating that an abnormality occurs inside the hybrid control device 10. Further, the first processor 20 turns on the first notification lamp 81. After that, the first processor 20 temporarily ends a series of the processes for the first processor. The first processor 20 then executes the process in step S10 again. The process in step S180 is the determination process.

On the other hand, in step S160, when the main data of the first reference data A1 and the main data of the first diagnostic data B1 match each other, the first processor 20 determines that the first reference data A1 and the first diagnostic data B1 correspond to each other (step S160: YES). In this case, the first processor 20 advances the process to step S170.

In step S170, the first processor 20 determines that at least one of peripheral devices has an abnormality. The peripheral devices include the first external bus 51, the second external bus 52, and the gateway device 60. When the first processor 20 determines that the at least one peripheral device has an abnormality, the first processor 20 stores, in the storage device 40, information indicating that the peripheral device has an abnormality. Further, the first processor 20 turns on the second notification lamp 82. After that, the first processor 20 temporarily ends a series of the processes for the first processor. The first processor 20 then executes the process in step S10 again. The process in step S170 is the determination process.

On the other hand, in step S50, when the second reference data A2 and the second diagnostic data B2 match each other, the first processor 20 determines that the second reference data A2 and the second diagnostic data B2 correspond to each other (step S50: YES). In this case, the first processor 20 advances the process to step S60.

In step S60, the first processor 20 executes the same processing as in step S160. That is, the first processor 20 determines whether the first reference data A1 transmitted in step S10 and the first diagnostic data B1 received in step S20 correspond to each other. When the first reference data A1 and the first diagnostic data B1 do not correspond to each other (step S60: NO), the first processor 20 advances the process to step S80. The process in step S60 is the first comparison process.

In step S80, the first processor 20 determines that an abnormality occurs inside the hybrid control device 10. The first processor 20 then stores, in the storage device 40, information indicating that an abnormality occurs inside the hybrid control device 10. Further, the first processor 20 turns on the first notification lamp 81. After that, the first processor 20 temporarily ends a series of the processes for the first processor. The first processor 20 then executes the process in step S10 again. The process in step S80 is the determination process.

On the other hand, in step S60, when the first reference data A1 and the first diagnostic data B1 correspond to each other (step S60: YES), the first processor 20 advances the process to step S70.

In step S70, the first processor 20 determines that the hybrid control device 10 and its peripheral devices operate normally. After that, the first processor 20 temporarily ends a series of the processes for the first processor. The first processor 20 then executes the process in step S10 again. The process in step S70 is the determination process.

Next, as the operation of the present embodiment, a relation between the determination results in the first comparison process (step S60, step S160) and the second comparison process (step S50), and the determination result in the determination process (step S70, step S80, step S170, step S180) will be described.

In the first comparison process, the first reference data A1 and the first diagnostic data B1 are compared. As shown in FIG. 1, the first processor 20, the second processor 30, and the internal bus 15 that are internal components of the hybrid control device 10 are involved in the generation, transmission, and reception of the first reference data A1 and the first diagnostic data B1. Therefore, the determination result in the first comparison process reflects whether an abnormality occurs inside the hybrid control device 10.

For example, when an abnormality occurs in the first processor 20, the first processor 20 may compare data that is different from the first reference data A1 transmitted to the second processor 30 with the first diagnostic data B1 in the first comparison process. Further, when an abnormality occurs in the second processor 30, the second processor 30 may set the main data of the first diagnostic data B1 to data that is different from the main data of the first reference data A1 when generating the first diagnostic data B1. Further, when an abnormality such as a disconnection occurs in the internal bus 15, the first reference data A1 output from the first processor 20 may not reach the second processor 30, or the first diagnostic data B1 output from the second processor 30 may not reach the first processor 20. In the cases above, in the first comparison process, the first reference data A1 and the first diagnostic data B1 do not correspond to each other, and the determination result in the first comparison process is thus NO. As described above, when the determination result in the first comparison process is NO, it is presumed that an abnormality occurs inside the hybrid control device 10.

In the second comparison process, the second reference data A2 and the second diagnostic data B2 are compared.

The first processor 20 and the internal bus 15 that are internal components of the hybrid control device 10 and the first external bus 51, the second external bus 52, and the gateway device 60 that are peripheral devices are involved in the generation, transmission, and reception of the second reference data A2 and the second diagnostic data B2. Therefore, the determination result in the second comparison process reflects whether an abnormality occurs in the internal components of the hybrid control device 10 and the peripheral devices.

For example, when an abnormality occurs in the first processor 20 among the internal components of the hybrid control device 10, the first processor 20 may compare data that is different from the second reference data A2 transmitted to the gateway device 60 with the second diagnostic data B2 in the second comparison process. Further, when an abnormality such as a disconnection occurs in the internal bus 15, the second reference data A2 output from the first processor 20 may not reach the first external bus 51, or the second diagnostic data B2 output from the gateway device 60 may not reach the first processor 20. In the cases above, in the second comparison process, the second reference data A2 and the second diagnostic data B2 do not correspond to each other, and the determination result in the second comparison process is thus NO.

Further, regarding the peripheral devices, when a connector of the first external bus 51 is disconnected from the hybrid control device 10 or the gateway device 60, or when the first external bus 51 is disconnected, the second reference data A2 may not be transmitted to the gateway device 60. Further, when a connector of the second external bus 52 is disconnected from the hybrid control device 10 or the gateway device 60, or when the second external bus 52 is disconnected, the second diagnostic data B2 may not be transmitted to the hybrid control device 10. Further, when an abnormality occurs in the gateway device 60, the gateway device 60 may not be able to receive the second reference data A2 or may not be able to transmit the second diagnostic data B2. In the cases above, in the second comparison process, the second reference data A2 and the second diagnostic data B2 do not correspond to each other, and the determination result in the second comparison process is thus NO.

As described above, when the determination result in the second comparison process is NO, it is suspected that the first processor 20 or the internal bus 15 among the internal components of the hybrid control device 10 has an abnormality or any peripheral device has an abnormality. Here, as described above, when the determination result in the first comparison process is NO, it is highly likely that an abnormality occurs inside the hybrid control device 10. Considering the above and that it is suspected that an abnormality occurs in the first processor 20 or the internal bus 15 when the determination result in the second comparison process is NO, when the determination result in the second comparison process is NO and the determination result in the first comparison process is NO, it is highly likely that an abnormality occurs in the first processor 20 or the internal bus 15 in particular among the internal components of the hybrid control device 10. From the above point of view, when the determination result in the second comparison process is NO and the determination result in the first comparison process is NO, the first processor 20 determines that an abnormality occurs inside the hybrid control device 10 (step S180).

On the other hand, when the determination result in the second comparison process is NO and the determination result in the first comparison process is YES, it is presumed that the internal components of the hybrid control device 10 are operating normally among the internal components of the hybrid control device 10 and the peripheral devices. Therefore, in this case, it is presumed that an abnormality occurs in the peripheral devices. From the above point of view, when the determination result in the second comparison process is NO and the determination result in the first comparison process is YES, the first processor 20 determines that an abnormality occurs in at least one of the peripheral devices (step S170).

When the determination result in the second comparison process is YES, it is presumed that the first processor 20 and the internal bus 15 among the internal components of the hybrid control device 10 and the peripheral devices are operating normally. At this time, when the determination in the first comparison process is NO, it is highly likely that an abnormality occurs in the internal component of the hybrid control device 10 other than the first processor 20 and the internal bus 15, that is, in the second processor 30. When the determination in the first comparison process is NO, it is conceivable that some sort of abnormality occurs inside the hybrid control device 10, for example, in the internal bus 15, in addition to the second processor 30. From the above point of view, when the determination result in the second comparison process is YES and the determination result in the first comparison process is NO, the first processor 20 determines that an abnormality occurs inside the hybrid control device 10 (step S80).

When the determination result in the second comparison process is YES, and the determination in the first comparison process is YES, there is no component where an abnormality is presumed. Therefore, when the determination result in the second comparison process is YES and the determination result in the first comparison process is YES, the first processor 20 determines that the internal components of the hybrid control device 10 and the peripheral devices are operating normally (step S70).

The first notification lamp 81 or the second notification lamp 82 is turned on in accordance with the contents of the determination in the determination process, whereby the device in which an abnormality occurs is notified during traveling or at the time of inspection at a maintenance shop, for example. Further, the contents of the determination process stored in the storage device 40 are read out at the maintenance shop, etc., and used to identify the device in which an abnormality occurs.

Next, an effect of the present embodiment will be described. (1) Detection of an abnormality in the hybrid control device 10 may use a control signal periodically that is transmitted from the hybrid control device 10 to the first control device 101 and the second control device 102. That is, the first control device 101 and the second control device 102 monitor the control signal from the hybrid control device 10, and detects an abnormality of the hybrid control device 10 when the control signal is interrupted. However, in the determination method above, whether the interruption of the control signal is attributable to an abnormality of the hybrid control device 10 or attributable to an abnormality in the devices other than the hybrid control device 10 such as disconnection of the connector of the first external bus 51 or the second external bus 52 cannot be identified. In this case, for example, when the abnormal device is replaced with a normal device at the maintenance shop in response to the detection of an abnormality, all of the hybrid control device 10, the first external bus 51, and the second external bus 52 have to be replaced, and the hybrid control device 10 may be replaced although the hybrid control device 10 is not the cause of the abnormality.

On the other hand, with the above configuration, combining the determination result in the first comparison process and the determination result in the second comparison process makes it possible to determine whether the abnormal device is the hybrid control device 10 or the peripheral device. Determination as to whether to replace the device based on the information above makes it possible to avoid unnecessary replacement of a normal device.

(2) In the configuration above, in the first comparison process, when the first processor 20 cannot receive the first diagnostic data B1 within the first specified period H1 after the first processor 20 transmits the first reference data A1, the first processor 20 determines that the first reference data A1 and the first diagnostic data B1 do not correspond to each other. Therefore, an abnormal state in which the first reference data A1 and the first diagnostic data B1 cannot be transmitted or received can be included in abnormality detection targets. Accordingly, it is possible to perform abnormality detection by covering a wide range of abnormal states that may occur in or around the hybrid control device 10. Similarly, in the second comparison process, when the first processor 20 cannot receive the second diagnostic data B2 within the second specified period H2 after the first processor 20 transmits the second reference data A2, the first processor 20 determines that the second reference data A2 and the second diagnostic data B2 do not correspond to each other. Therefore, an abnormal state in which the second reference data A2 and the second diagnostic data B2 cannot be transmitted or received can be included in the abnormality detection targets.

(3) In the above configuration, in the diagnostic process, a relay function of the gateway device 60 is used, and the second reference data A2 is used as the second diagnostic data B2 without change. In this case, the gateway device 60 does not require complicated arithmetic processing for generating the second diagnostic data B2. Accordingly, an increase in a processing load of the gateway device 60 due to execution of the diagnostic processing can be minimized. Further, execution of the diagnostic process using the gateway device 60 makes it possible to realize the diagnostic process without intervening the process executed by other control devices, such as the first control device 101 and the second control device 102. Therefore, the processing load of other control devices is not increased.

In addition, the present embodiment can be implemented by changing as follows. The present embodiment and the following modifications can be implemented in combination with each other within a technically consistent range. Means for causing an occupant or a maintenance worker to identify the contents of the determination in the determination process is not limited to the example of the above embodiment, such as use of the notification lamp or storage of the contents of the determination in the storage device 40. For example, a message may be displayed on a display. Moreover, the number of the above means may be any number.

The communication path for transmitting and receiving the second reference data A2 and the second diagnostic data B2 between the first processor 20 of the hybrid control device 10 and the gateway device 60 is not limited to the example of the above embodiment. For example, the first processor 20 and the gateway device 60 may transmit and receive the second reference data A2 and the second diagnostic data B2 using the same external bus.

The contents and process procedure of the diagnostic process are not limited to the example of the above embodiment. As the diagnostic process, it is sufficient that the determination process of each pattern can be executed based on the determination results in the first comparison process and the second comparison process. For example, the first transmission process, the first response process, and the first reception process may be executed after the second transmission process, the second response process, and the second reception process are executed.

The countermeasure when the first processor 20 cannot receive the first diagnostic data B1 within the first specified period H1 after the first processor 20 transmits the first reference data A1 is not limited to setting of the abnormality data as the first diagnostic data B1 in the example of the embodiment above. For example, a flag may be set to indicate that the first processor 20 fails to receive the first diagnostic data B1 within the first specified period H1 after the first processor 20 transmits the first reference data A1. Then, when the flag is turned on, the first processor 20 may determine in the first comparison process that the first reference data A1 and the first diagnostic data B1 do not correspond to each other. With the configuration above, the process to set the abnormality data as the first diagnostic data B1 is not required. The same applies to the case where the second diagnostic data B2 cannot be received within the second specified period H2.

When the first processor 20 cannot receive the first diagnostic data B1 within the first specified period H1 after the first processor 20 transmits the first reference data A1, the following configuration may be adopted in place of determination that the first reference data A1 and the first diagnostic data B1 do not correspond to each other. That is, after transmitting the first reference data A1, the first processor 20 repeats a reception process to receive the first diagnostic data B1. When the first processor 20 cannot receive the first diagnostic data B1 even after repeating the reception process a predetermined number of times, the first processor 20 determines that the first reference data A1 and the first diagnostic data B1 do not correspond to each other. The process contents of the diagnostic process may be changed so as to realize the process above. Determination that the second reference data A2 and the second diagnostic data B2 do not correspond to each other when the first processor 20 cannot receive the second diagnostic data B2 within the second specified period H2 after the first processor 20 transmits the second reference data A2 may be changed to a mode in which a reception process similar to the above is used.

The processing device is not limited to the hybrid control device 10. The processing device may have a first processor and a second processor that are communicable with each other via an internal bus. Further, it is sufficient as long as each of the processes for the first processor and for the second processor can be executed. As the processing device, for example, an internal combustion engine control device or a brake control device may be adopted.

The other device is not limited to the gateway device 60. The other device may be any device that is communicable with the processing device via the external bus and can transmit the second diagnostic data B2 to the processing device when the second reference data A2 is received from the processing device. A control device may be adopted as the other device. An example of a communication system when a control device is used as the other device will be described with reference to FIG. 4.

Figure 4:
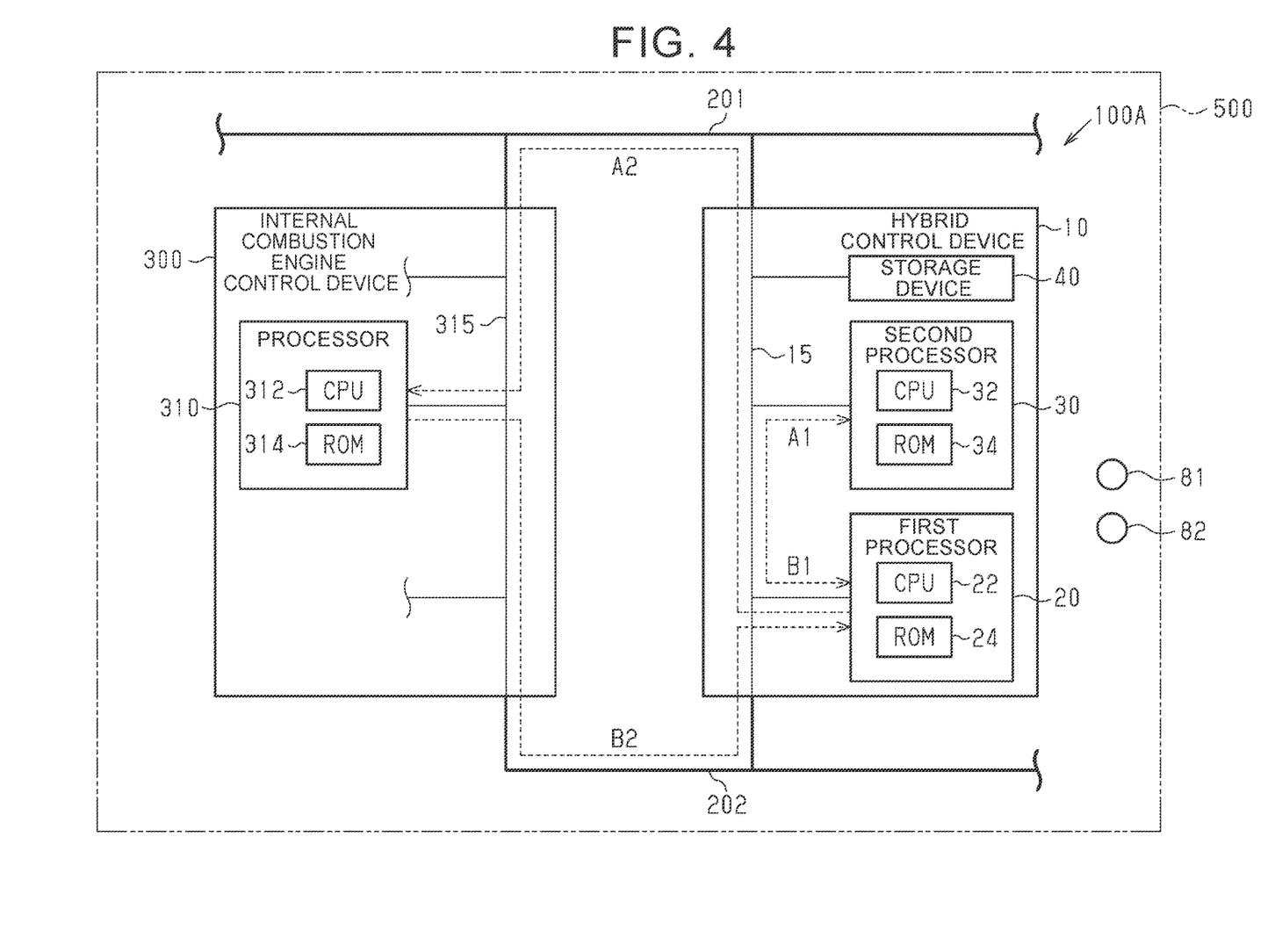
FIG. 4 is a schematic view showing a modification of the communication system.

In the example shown in FIG. 4, the hybrid control device 10 is mounted on the vehicle 500. The configuration of the hybrid control device 10 is the same as the configuration of the above embodiment. Therefore, the description thereof will be omitted. Similar to the above embodiment, the hybrid control device 10 constitutes the processing device. In FIG. 4, the components having the same or substantially the same functions as those in FIG. 1 are designated by the same reference signs as those in FIG. 1.

The vehicle 500 is equipped with an internal combustion engine control device 300 that controls an internal combustion engine. The internal combustion engine control device 300 includes a processor 310 that executes various processes in accordance with a computer program (software). The processor 310 includes a CPU 312 and a memory such as a RAM or a ROM 314. The memory stores a program code or a command configured to cause the CPU 312 to execute the processes. The memory, that is, a computer-readable medium, includes any available medium accessible by a general purpose or a dedicated computer. Although not shown, the internal combustion engine control device 300 includes a storage device, etc. that is an electrically rewritable non-volatile memory. The storage device and the processor 310 are communicable with each other via an internal bus 315 that is a communication line.

The internal bus 15 of the hybrid control device 10 and the internal bus 315 of the internal combustion engine control device 300 are connected by a first external bus 201 that is a CAN communication line. The first external bus 201 branches at two points between the hybrid control device 10 and the internal combustion engine control device 300. Further, the internal bus 15 of the hybrid control device 10 and the internal bus 315 of the internal combustion engine control device 300 are connected by a second external bus 202 that is a CAN communication line. The second external bus 202 branches at a point between the hybrid control device 10 and the internal combustion engine control device 300. The hybrid control device 10, the internal combustion engine control device 300, the first external bus 201, and the second external bus 202 constitute a communication system 100A.

Even with the communication system 100A above, the same diagnostic process as in the above embodiment can be executed. In this case, when the first processor 20 of the hybrid control device 10 generates the second reference data A2 in the second transmission process, the first processor 20 sets the processor 310 of the internal combustion engine control device 300 as the identifier of the destination serving as the header data. When the first processor 20 generates the second reference data A2, the first processor 20 transmits the second reference data A2 to the processor 310 of the internal combustion engine control device 300 via the first external bus 201. When the processor 310 of the internal combustion engine control device 300 receives the second reference data A2, the processor 310 executes the second response process. That is, when the processor 310 receives the second reference data A2, the processor 310 generates the second diagnostic data B2. The processor 310 sets the main data of the second reference data A2 as the main data of the second diagnostic data B2. Further, the processor 310 sets the first processor 20 of the hybrid control device 10 as the identifier of the destination, as the header data of the second diagnostic data B2. When the processor 310 generates the second diagnostic data B2, the processor 310 transmits the second diagnostic data B2 to the first processor 20 of the hybrid control device 10 via the second external bus 202. Other processes may be executed in the same manner as the diagnostic process of the above embodiment. In the determination process, the gateway device 60 may be read as the internal combustion engine control device 300 and the determination as to whether an abnormality occurs in each device may be made.

In the modification shown in FIG. 4, the control device adopted as the other device is not limited to the internal combustion engine control device 300. The control device adopted as the other device may be, for example, a motor control device that controls a motor.

In the modification shown in FIG. 4, the control device adopted as the other device may add other data or a message to the second diagnostic data B2 and transmit the second diagnostic data B2 to the hybrid control device 10. Examples of the data to be added to the second diagnostic data B2 include the total number of times at which a series of processes in the diagnostic process is executed and a history of the determination results of the diagnostic process.

The contents of the main data of the first reference data A1 and the main data of the first diagnostic data B1 are not limited to the examples of the above embodiments. The contents of the main data may be set as appropriate. The main data may indicate, for example, the total number of times at which a series of processes in the diagnostic process is executed. The same applies to the main data of the second reference data A2 and the main data of the second diagnostic data B2.

The contents and values of the main data of the first reference data A1 and the main data of the first diagnostic data B1 may be different from each other. Even in this case, as long as the main data of the first reference data A1 and the main data of the first diagnostic data B1 include information associated with each other, the first reference data A1 and the first diagnostic data B1 may be treated that the first reference data A1 and the first diagnostic data B1 correspond to each other. Here, the information associated with each other is information indicating that a combination in which, when the first reference data A1 is "P", the first diagnostic data B1 is "Q", for example, is predetermined. For example, use of a map can set the first reference data A1 and the first diagnostic data B1 to different values associated with each other. Specifically, the first processor 20 or the second processor 30 stores in advance a map indicating a combination in which, when the first reference data A1 is "P", the first diagnostic data B1 is "Q". When the first reference data A1 received from the first processor 20 includes "P", the second processor 30 generates the first diagnostic data B1 including "Q" based on the map and transmits the generated first diagnostic data B1 to the first processor 20. When the first processor 20 receives the first diagnostic data B1, the first processor 20 determines that the first reference data A1 and the first diagnostic data B1 correspond to each other based on that the first diagnostic data B1 includes "Q" in accordance with the map above. The disclosure is not limited to the mode in which the map above is used, and the first reference data A1 and the first diagnostic data B1 may be any combination of data associated with each other in advance.

Similar to the modification above with respect to the first reference data A1 and the first diagnostic data B1, as long as the main data of the second reference data A2 and the main data of the second diagnostic data B2 include information associated with each other, the second reference data A2 and the second diagnostic data B2 may be treated that the second reference data A2 and the second diagnostic data B2 correspond to each other.

The contents of the header data of the first reference data A1 and the header data of the first diagnostic data B1 are not limited to the examples of the above embodiments. The header data may include other types of information in addition to the identifier of the destination, for example. The same applies to the header data of the second reference data A2 and the header data of the second diagnostic data B2.

The vehicle to which the processing system is applied is not limited to a hybrid vehicle. That is, the vehicle to which the processing system is applied may be a vehicle that uses only the internal combustion engine as a drive source, or a vehicle that does not have an internal combustion engine and uses only a motor as a drive source.

A processing device according to a first aspect of the present disclosure includes: a first processor configured to execute a first transmission process, a first reception process, a first comparison process, a second transmission process, a second reception process, a second comparison process, and a determination process; and a second processor configured to communicate with the first processor via an internal bus, and execute a first response process. The first transmission process is a process of transmitting first reference data to the second processor via the internal bus, the first response process is a process of transmitting first diagnostic data that is response data to the first reference data when the first reference data is received, the first reception process is a process of receiving the first diagnostic data from the second processor via the internal bus, the first comparison process is a process of determining whether the first reference data that is transmitted and the first diagnostic data that is received correspond to each other, the second transmission process is a process of transmitting second reference data to an external device provided outside the processing device via an external bus, the second reception process is a process of receiving second diagnostic data that is response data to the second reference data from the external device via the external bus, the second comparison process is a process of determining whether the second reference data that is transmitted and the second diagnostic data that is received correspond to each other, the determination process is a process of determining an abnormality based on a determination result in the first comparison process and a determination result in the second comparison process, and the determination process includes a process of determining that the abnormality occurs inside the processing device when the first reference data and the first diagnostic data do not correspond to each other, and a process of determining that the abnormality occurs in at least one of the external bus or the external device when the first reference data and the first diagnostic data correspond to each other, and the second reference data and the second diagnostic data do not correspond to each other.

According to the above aspect, whether the device in which an abnormality occurs is the processing device, or the external bus or the other device is determined based on the comparison result between the first reference data and the first diagnostic data and the comparison result between the second reference data and the second diagnostic data. Determination of the device in which an abnormality occurs as described above makes it possible to accurately identify the device in which an abnormality occurs.

In the above aspect, the first response process may include a process of transmitting the first diagnostic data within a predetermined first specified period after the first reference data is received. The first comparison process may include a process of determining that the first reference data and the first diagnostic data do not correspond to each other when the first diagnostic data is not able to be received within the predetermined first specified period in the first reception process after the first reference data is transmitted in the first transmission process. The second comparison process may include a process of determining that the second reference data and the second diagnostic data do not correspond to each other when the second diagnostic data is not able to be received within a predetermined second specified period in the second reception process after the second reference data is transmitted in the second transmission process.

Communication between the first processor and the second processor may be interrupted depending on the communication state of the internal bus. In the above configuration, the first reference data and the first diagnostic data are determined not to correspond to each other in such a situation. With the configuration above, an abnormality of the device can be determined while the situation where the communication by the internal bus is interrupted is included as the determination target. Similarly, with the configuration above, an abnormality of the device can be determined while the situation where the communication by the external bus is interrupted is included as the determination target.

In the above aspect, the first reference data and the second reference data may each include header data and main data. The header data included in the first reference data may indicate a destination of the first reference data. The main data included in the first reference data may indicate time when the first reference data is generated. The header data included in the second reference data may indicate a destination of the second reference data. The main data included in the second reference data may indicate time when the second reference data is generated.

In the above aspect, the first diagnostic data may include the header data and the main data. The header data included in the first diagnostic data may indicate a destination of the first diagnostic data. The main data included in the first reference data may be set as the main data included in the first diagnostic data. The second reference data may be set as the second diagnostic data.

In the above aspect, the header data included in the first reference data may indicate the second processor as the destination of the first reference data. The header data included in the first diagnostic data may indicate the first processor as the destination of the first diagnostic data. The header data included in the second reference data may indicate the first processor as a destination of the second diagnostic data. The second reference data may be transmitted to the first processor as the second diagnostic data via the external device.

In the above aspect, the external device may be a relay device configured to output data input into the external device, based on the header data included in the data.

In the above aspect, the first diagnostic data and the second diagnostic data may each include the header data and the main data. The header data included in the first diagnostic data may indicate a destination of the first diagnostic data. The main data included in the first reference data may be set as the main data included in the first diagnostic data. The header data included in the second diagnostic data may indicate a destination of the second diagnostic data. The main data included in the second reference data may be set as the main data included in the second diagnostic data.

In the above aspect, the header data included in the first reference data may indicate the second processor as the destination of the first reference data. The header data included in the first diagnostic data may indicate the first processor as the destination of the first diagnostic data. The header data included in the second reference data may indicate the external device as the destination of the second reference data. The header data included in the second diagnostic data may indicate the first processor as the destination of the second diagnostic data.

In the above aspect, the external device may include a third processor configured to communicate with the first processor via the external bus.

A communication system according to a second aspect of the present disclosure includes: a processing device including a first processor and a second processor configured to be communicable with the first processor via an internal bus, the first processor being configured to execute a first transmission process, a first reception process, a first comparison process, a second transmission process, a second reception process, a second comparison process, and a determination process, and the second processor being configured to execute a first response process; and an external device provided outside the processing device and configured to communicate with the processing device via an external bus, the external device configured to execute a second response process. The first transmission process is a process of transmitting first reference data to the second processor via the internal bus, the first response process is a process of transmitting first diagnostic data that is response data to the first reference data when the first reference data is received, the first reception process is a process of receiving the first diagnostic data from the second processor via the internal bus, the first comparison process is a process of determining whether the first reference data that is transmitted and the first diagnostic data that is received correspond to each other, the second transmission process is a process of transmitting second reference data to the external device via the external bus, the second response process is a process of transmitting second diagnostic data that is response data to the second reference data when the second reference data is received, the second reception process is a process of receiving the second diagnostic data from the external device via the external bus, the second comparison process is a process of determining whether the second reference data that is transmitted and the second diagnostic data that is received correspond to each other, the determination process is a process of determining an abnormality based on a determination result in the first comparison process and a determination result in the second comparison process, and the determination process includes a process of determining that the abnormality occurs inside the processing device when the first reference data and the first diagnostic data do not correspond to each other, and a process of determining that the abnormality occurs in at least one of the external bus or the external device when the first reference data and the first diagnostic data correspond to each other, and the second reference data and the second diagnostic data do not correspond to each other.

In the above aspect, whether the device in which an abnormality occurs is the processing device, or the external bus or the other device is determined based on the comparison result between the first reference data and the first diagnostic data and the comparison result between the second reference data and the second diagnostic data. Determination of the device in which an abnormality occurs as described above makes it possible to accurately identify the device in which an abnormality occurs.

In the above aspect, the first response process may include a process of transmitting the first diagnostic data within a predetermined first specified period after the first reference data is received. The second response process may include a process of transmitting the second diagnostic data within a predetermined second specified period after the second reference data is received. The first comparison process may include a process of determining that the first reference data and the first diagnostic data do not correspond to each other when the first diagnostic data is not able to be received within the predetermined first specified period in the first reception process after the first reference data is transmitted in the first transmission process. The second comparison process may include a process of determining that the second reference data and the second diagnostic data do not correspond to each other when the second diagnostic data is not able to be received within the predetermined second specified period in the second reception process after the second reference data is transmitted in the second transmission process.

Communication between the first processor and the second processor may be interrupted depending on the communication state of the internal bus. In the above configuration, the first reference data and the first diagnostic data are determined not to correspond to each other in such a situation. With the configuration above, an abnormality of the device can be determined while the situation where the communication by the internal bus is interrupted is included as the determination target. Similarly, with the configuration above, an abnormality of the device can be determined while the situation where the communication by the external bus is interrupted is included as the determination target.

In the above aspect, the second response process may include a process of transmitting the same data as the second reference data as the second diagnostic data. In the above configuration, the external device (the other device) does not require complicated arithmetic processing related to generation of the diagnostic data. Therefore, the processing load of the other device for executing the second response process can be minimized.

A non-transitory storage medium according to a third aspect of the present disclosure stores instructions that are executable by a first processor and a second processor configured to communicate with the first processor via an internal bus and that cause the first processor to execute a first transmission process, a first reception process, a first comparison process, a second transmission process, a second reception process, a second comparison process, and a determination process, and cause the second processor to execute a first response process, the first processor and the second processor being provided in a processing device. The first transmission process is a process of transmitting first reference data to the second processor via the internal bus, the first response process is a process of transmitting first diagnostic data that is response data to the first reference data when the first reference data is received, the first reception process is a process of receiving the first diagnostic data from the second processor via the internal bus, the first comparison process is a process of determining whether the first reference data that is transmitted and the first diagnostic data that is received correspond to each other, the second transmission process is a process of transmitting second reference data to an external device provided outside the processing device via an external bus, the second reception process is a process of receiving second diagnostic data that is response data to the second reference data from the external device via the external bus, the second comparison process is a process of determining whether the second reference data that is transmitted and the second diagnostic data that is received correspond to each other, the determination process is a process of determining an abnormality based on a determination result in the first comparison process and a determination result in the second comparison process, and the determination process includes a process of determining that the abnormality occurs inside the processing device when the first reference data and the first diagnostic data do not correspond to each other, and a process of determining that the abnormality occurs in at least one of the external bus or the external device when the first reference data and the first diagnostic data correspond to each other, and the second reference data and the second diagnostic data do not correspond to each other.

In the above aspect, whether the device in which an abnormality occurs is the processing device, or the external bus or the other device is determined based on the comparison result between the first reference data and the first diagnostic data and the comparison result between the second reference data and the second diagnostic data. Determination of the device in which an abnormality occurs as described above makes it possible to accurately identify the device in which an abnormality occurs.

What is claimed is:

1. A processing device comprising:
   a first processor configured to execute a first transmission process, a first reception process, a first comparison process, a second transmission process, a second reception process, a second comparison process, and a determination process; and
   a second processor configured to
     communicate with the first processor via an internal bus, and
     execute a first response process,
   wherein
   the first transmission process is a process of transmitting first reference data to the second processor via the internal bus,
   the first response process is a process of transmitting first diagnostic data that is response data to the first reference data when the first reference data is received,
   the first reception process is a process of receiving the first diagnostic data from the second processor via the internal bus,
   the first comparison process is a process of determining whether the first reference data that is transmitted and the first diagnostic data that is received correspond to each other,
   the second transmission process is a process of transmitting second reference data to an external device provided outside the processing device via an external bus,
   the second reception process is a process of receiving second diagnostic data that is response data to the second reference data from the external device via the external bus,
   the second comparison process is a process of determining whether the second reference data that is transmitted and the second diagnostic data that is received correspond to each other,
   the determination process is a process of determining an abnormality based on a determination result in the first comparison process and a determination result in the second comparison process, and
   the determination process includes
     a process of determining that the abnormality occurs inside the processing device when the first reference data and the first diagnostic data do not correspond to each other, and
     a process of determining that the abnormality occurs in at least one of the external bus or the external device when the first reference data and the first diagnostic data correspond to each other, and the second reference data and the second diagnostic data do not correspond to each other.

2. The processing device according to claim 1, wherein:
   the first response process includes a process of transmitting the first diagnostic data within a predetermined first specified period after the first reference data is received;
   the first comparison process includes a process of determining that the first reference data and the first diagnostic data do not correspond to each other when the first diagnostic data is not able to be received within the predetermined first specified period in the first reception process after the first reference data is transmitted in the first transmission process; and
   the second comparison process includes a process of determining that the second reference data and the second diagnostic data do not correspond to each other when the second diagnostic data is not able to be received within a predetermined second specified period in the second reception process after the second reference data is transmitted in the second transmission process.

3. The processing device according to claim 1, wherein:
   the first reference data and the second reference data each include header data and main data;
   the header data included in the first reference data indicates a destination of the first reference data;
   the main data included in the first reference data indicates time when the first reference data is generated;
   the header data included in the second reference data indicates a destination of the second reference data; and
   the main data included in the second reference data indicates time when the second reference data is generated.

4. The processing device according to claim 3, wherein:
   the first diagnostic data includes the header data and the main data;
   the header data included in the first diagnostic data indicates a destination of the first diagnostic data;
   the main data included in the first reference data is set as the main data included in the first diagnostic data; and
   the second reference data is set as the second diagnostic data.

5. The processing device according to claim 4, wherein:
   the header data included in the first reference data indicates the second processor as the destination of the first reference data;
   the header data included in the first diagnostic data indicates the first processor as the destination of the first diagnostic data;
   the header data included in the second reference data indicates the first processor as a destination of the second diagnostic data; and
   the second reference data is transmitted to the first processor as the second diagnostic data via the external device.

6. The processing device according to claim 4, wherein the external device is a relay device configured to output data input into the external device, based on the header data included in the data.

7. The processing device according to claim 3, wherein:
   the first diagnostic data and the second diagnostic data each include the header data and the main data;
   the header data included in the first diagnostic data indicates a destination of the first diagnostic data;

the main data included in the first reference data is set as the main data included in the first diagnostic data;

the header data included in the second diagnostic data indicates a destination of the second diagnostic data; and the main data included in the second reference data is set as the main data included in the second diagnostic data.

8. The processing device according to claim 7, wherein:

the header data included in the first reference data indicates the second processor as the destination of the first reference data;

the header data included in the first diagnostic data indicates the first processor as the destination of the first diagnostic data;

the header data included in the second reference data indicates the external device as the destination of the second reference data; and the header data included in the second diagnostic data indicates the first processor as the destination of the second diagnostic data.

9. The processing device according to claim 7, wherein the external device includes a third processor configured to communicate with the first processor via the external bus.

10. A communication system, comprising:

a processing device including a first processor and a second processor configured to be communicable with the first processor via an internal bus, the first processor being configured to execute a first transmission process, a first reception process, a first comparison process, a second transmission process, a second reception process, a second comparison process, and a determination process, and the second processor being configured to execute a first response process; and an external device provided outside the processing device and configured to communicate with the processing device via an external bus, the external device configured to execute a second response process, wherein the first transmission process is a process of transmitting first reference data to the second processor via the internal bus, the first response process is a process of transmitting first diagnostic data that is response data to the first reference data when the first reference data is received, the first reception process is a process of receiving the first diagnostic data from the second processor via the internal bus, the first comparison process is a process of determining whether the first reference data that is transmitted and the first diagnostic data that is received correspond to each other, the second transmission process is a process of transmitting second reference data to the external device via the external bus, the second response process is a process of transmitting second diagnostic data that is response data to the second reference data when the second reference data is received, the second reception process is a process of receiving the second diagnostic data from the external device via the external bus, the second comparison process is a process of determining whether the second reference data that is transmitted and the second diagnostic data that is received correspond to each other, the determination process is a process of determining an abnormality based on a determination result in the first comparison process and a determination result in the second comparison process, and the determination process includes a process of determining that the abnormality occurs inside the processing device when the first reference data and the first diagnostic data do not correspond to each other, and a process of determining that the abnormality occurs in at least one of the external bus or the external device when the first reference data and the first diagnostic data correspond to each other, and the second reference data and the second diagnostic data do not correspond to each other.

11. The communication system according to claim 10, wherein:

the first response process includes a process of transmitting the first diagnostic data within a predetermined first specified period after the first reference data is received;

the second response process includes a process of transmitting the second diagnostic data within a predetermined second specified period after the second reference data is received;

the first comparison process includes a process of determining that the first reference data and the first diagnostic data do not correspond to each other when the first diagnostic data is not able to be received within the predetermined first specified period in the first reception process after the first reference data is transmitted in the first transmission process; and the second comparison process includes a process of determining that the second reference data and the second diagnostic data do not correspond to each other when the second diagnostic data is not able to be received within the predetermined second specified period in the second reception process after the second reference data is transmitted in the second transmission process.

12. The communication system according to claim 10, wherein the second response process includes a process of transmitting the same data as the second reference data as the second diagnostic data.

13. A non-transitory storage medium storing instructions that are executable by a first processor and a second processor configured to communicate with the first processor via an internal bus and that cause the first processor to execute a first transmission process, a first reception process, a first comparison process, a second transmission process, a second reception process, a second comparison process, and a determination process, and cause the second processor to execute a first response process, the first processor and the second processor being provided in a processing device, wherein the first transmission process is a process of transmitting first reference data to the second processor via the internal bus, the first response process is a process of transmitting first diagnostic data that is response data to the first reference data when the first reference data is received, the first reception process is a process of receiving the first diagnostic data from the second processor via the internal bus, the first comparison process is a process of determining whether the first reference data that is transmitted and the first diagnostic data that is received correspond to each other, the second transmission process is a process of transmitting second reference data to an external device provided outside the processing device via an external bus,
the second reception process is a process of receiving second diagnostic data that is response data to the second reference data from the external device via the external bus,
the second comparison process is a process of determining whether the second reference data that is transmitted and the second diagnostic data that is received correspond to each other,
the determination process is a process of determining an abnormality based on a determination result in the first comparison process and a determination result in the second comparison process, and
the determination process includes
  a process of determining that the abnormality occurs inside the processing device when the first reference data and the first diagnostic data do not correspond to each other, and
  a process of determining that the abnormality occurs in at least one of the external bus or the external device when the first reference data and the first diagnostic data correspond to each other, and the second reference data and the second diagnostic data do not correspond to each other.

* * * * *